Figure 1:
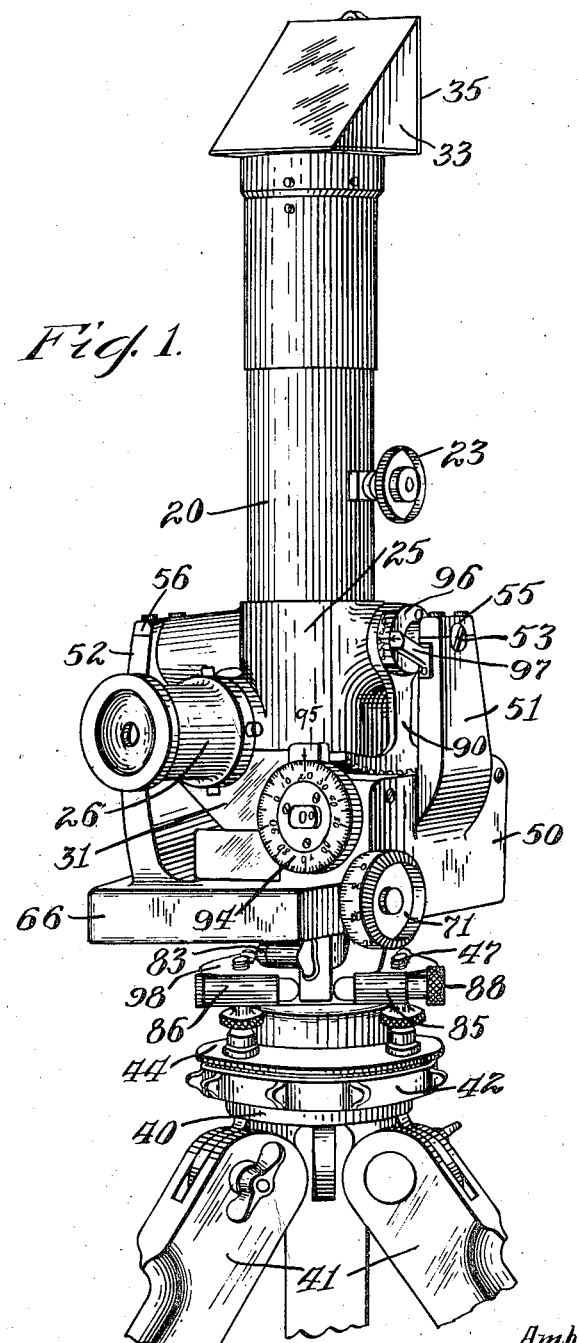

No. 862,293. PATENTED AUG. 6, 1907.
A. SWASEY.
TELESCOPE.
APPLICATION FILED APR. 10, 1906.

6 SHEETS—SHEET 1.

Witnesses:
C. C. Fuss.
H. Fleischer.

Inventor:
Ambrose Swasey,
By his Attorney,
F. A. Richards.

No. 862,293. PATENTED AUG. 6, 1907.
A. SWASEY.
TELESCOPE.
APPLICATION FILED APR. 10, 1906.

6 SHEETS—SHEET 2.

Witnesses:
Harry Fleischer
A. Horden Gibbs

Inventor:
Ambrose Swasey,
By his Attorney,
F. H. Richards.

No. 862,293. PATENTED AUG. 6, 1907.
A. SWASEY.
TELESCOPE.
APPLICATION FILED APR. 10, 1906.
6 SHEETS—SHEET 3.
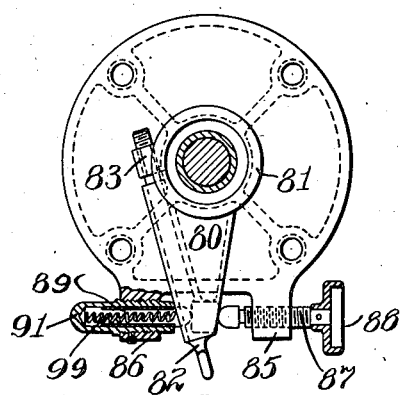
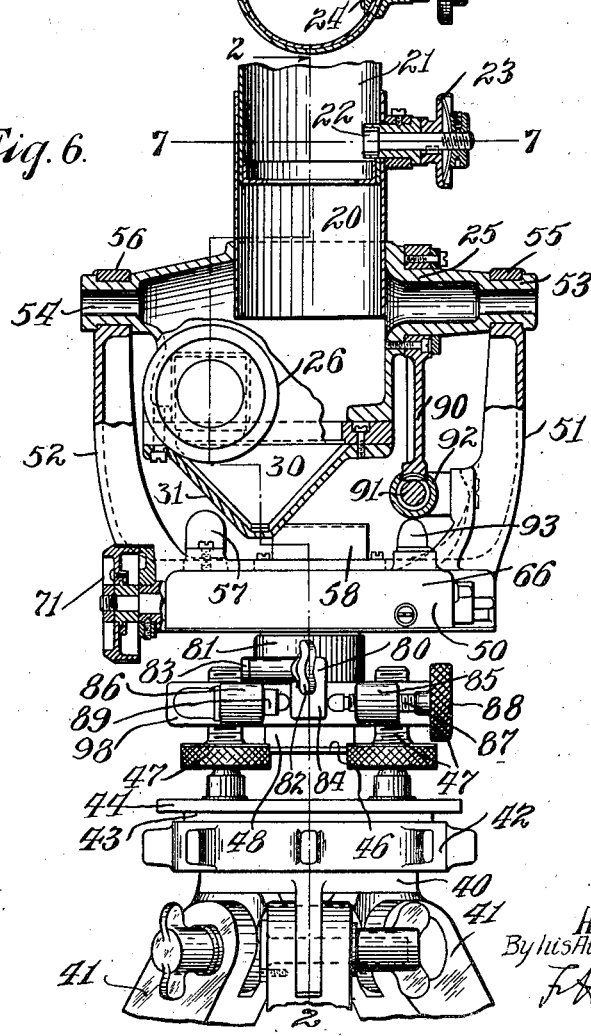
Witnesses:
H. Fleischer,
M. W. Gibbs
Inventor:
Ambrose Swasey,
By his Attorney,
F. H. Richards.

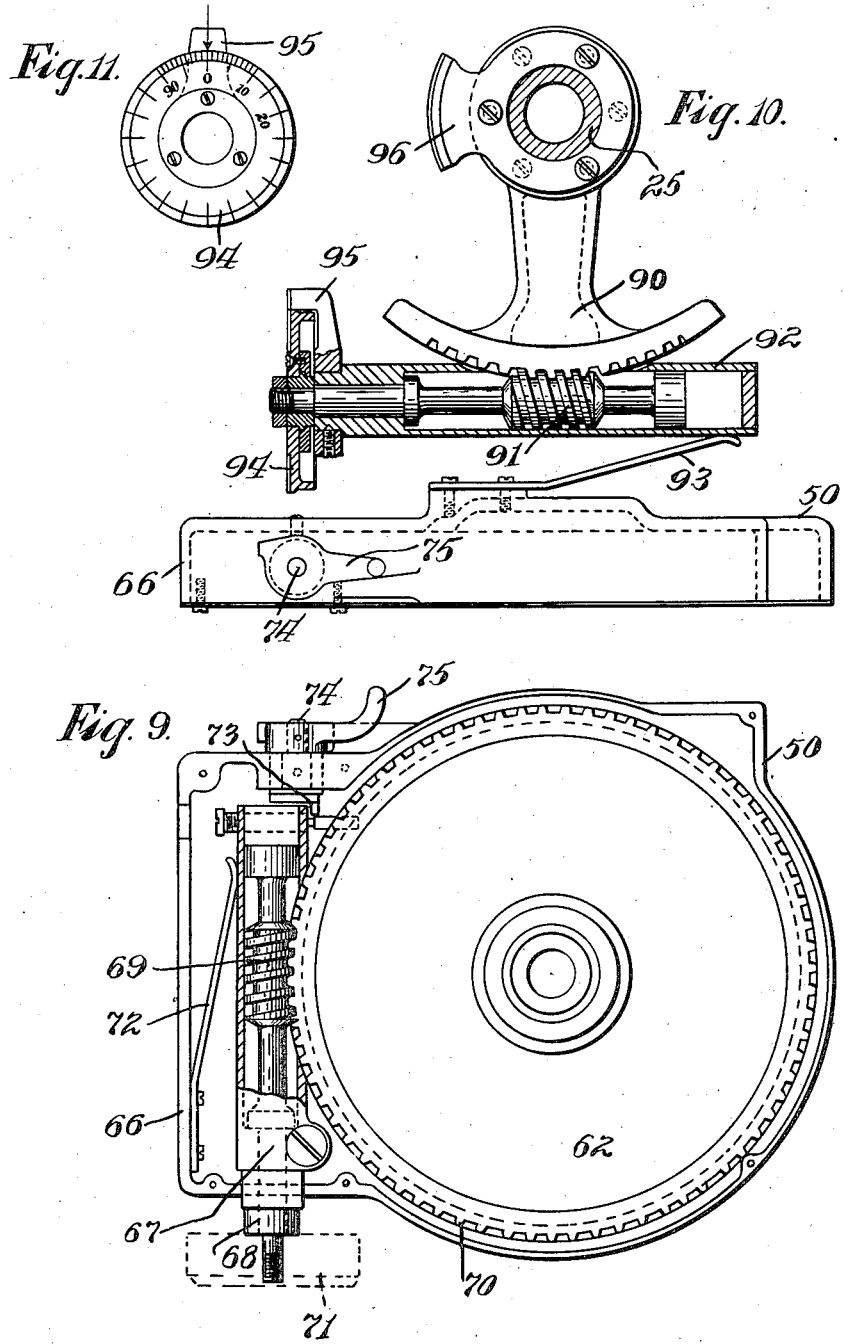

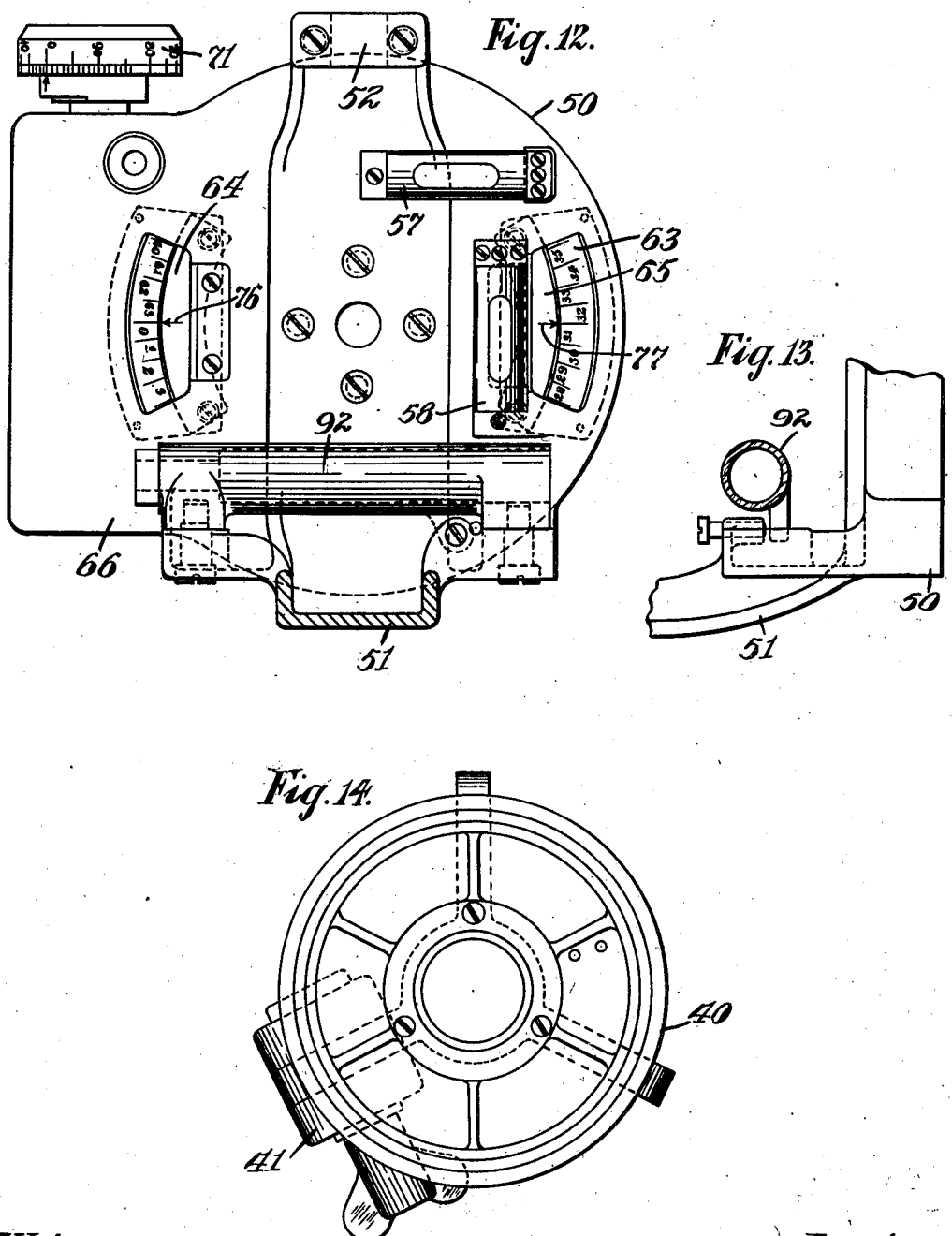

No. 862,293. PATENTED AUG. 6, 1907.
A. SWASEY.
TELESCOPE.
APPLICATION FILED APR. 10, 1906.
6 SHEETS—SHEET 6.
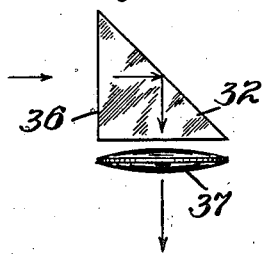
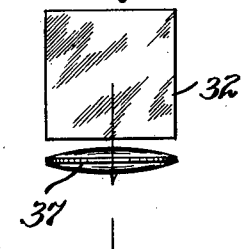
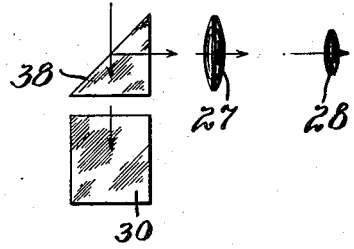
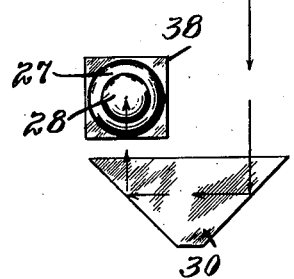
Witnesses:
A. Worden Gibbs
W. Fleischer
Inventor:
Ambrose Swasey,
By his Attorney,
F. H. Richards.

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

TELESCOPE.

No. 862,293.   Specification of Letters Patent.   Patented Aug. 6, 1907.

Application filed April 10, 1906. Serial No. 310,911.

*To all whom it may concern:*

Be it known that I, AMBROSE SWASEY, a citizen of the United States, residing in Cleveland, in the county of Cuyahoga and State of Ohio, have invented certain new and useful Improvements in Telescopes, of which the following is a specification.

This invention relates to sighting instruments designed for the purpose of permitting the operator to be shielded behind a wall or parapet, and to sight through the instrument an object situated beyond the wall and obstructed from the direct line of vision of the operator.

A further object of the invention is to provide such an instrument with means for determining the range or depression of the object; and also to determine its azimuth or horizontal angle relative to another point, such as a back-sight that is readily visible to the operator upon swinging the instrument upon its vertical axis.

The invention further comprehends means for swinging the telescope of the device on a horizontal axis, and for determining the angle of such movement.

The invention also comprehends means for swinging the telescope on a vertical axis to ascertain the azimuth; and also means for swinging the indicating scale on the same axis whereby the zero mark can be brought to register with the indicator when the telescope is focused on the object, or on the back sight; whereby the swinging of the telescope and pointer relative to the adjusted scale will at once indicate the angle of the conventional azimuth.

Such an instrument is of paramount utility in connection with artillery or ordnance, whereby the commander or captain may himself be shielded behind a parapet, and use the instrument, whose receiving optical element is brought to extend above such obstruction. The instrument can be focused on the object and the indicator and scale brought to register at 0. Thereupon, the scale is locked, and the telescope swung around to focus on a convenient object in the rear or opposite direction, and the azimuth or horizontal angle indicated on the scale will be noted. The gunner is informed of such angle, and will adjust his sighting device by focusing it on the same rear-sight, and then swing it around the same angular distance, which will evidently cause the gun to be sighted upon the desired object. The location of the object relative to the horizontal line of the gun can also be readily determined, in addition to its range or distance; and such factors will be considered by the gunner in order to make the necessary provision therefor.

Figure 3:
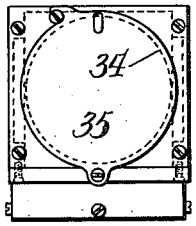
Figure 2:
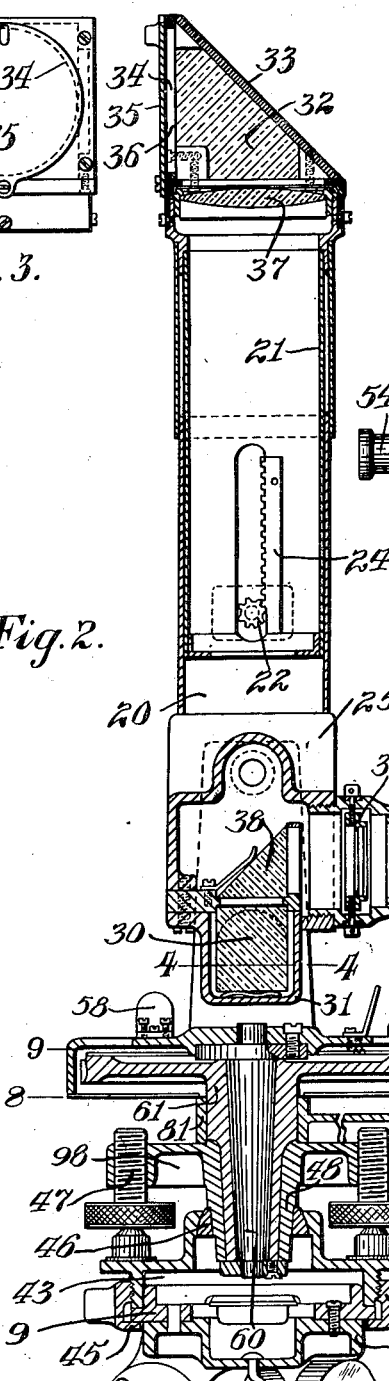
Figure 4:
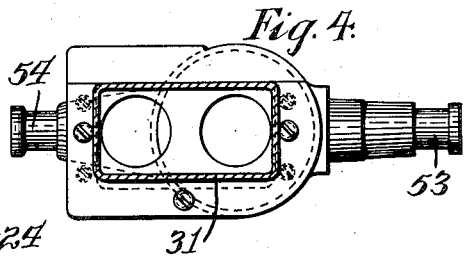
Figure 5:
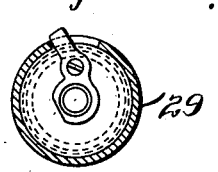

One embodiment of my invention is illustrated in the accompanying drawings, in which Figure 1 is a perspective view of the device mounted on a tripod, the legs of which are shown at their upper ends only. Fig. 2 is a vertical section through the axis of the device, on the line 2—2 of Fig. 6. Fig. 3 is a side elevation of the receiving end of the telescope. Fig. 4 is a horizontal section on the line 4—4 of Fig. 2, looking upward. Fig. 5 is an end view of the eye-piece. Fig. 6 is a vertical section through the instrument at a right angle to the section shown in Fig. 2 with the upper part of the telescope broken away. Fig. 7 is a horizontal section on the line 7—7 indicated in Fig. 6. Fig. 8 is a horizontal section taken on the line 8—8 indicated in Fig. 2. Fig. 9 is a plan view partly in section, of the means for swinging the table. Fig. 10 is a fragmentary view showing the screw and segment for swinging the telescope on a horizontal axis, with co-operating parts. Fig. 11 shows the indicator for the parts shown in Fig. 10. Fig. 12 is a plan view of the table, but showing one of the side arms in section. Fig. 13 is a fragmentary view showing the support on one of side arms on the base. Fig. 14 is a plan view of the lower plate of the support. Fig. 15 is a diagram illustrating the arrangement of the optical elements; and Fig. 16 is a similar view, but taken at right angles to Fig. 15, these two views showing the projection of the image.

The instrument comprises two members, the sighting member or telescope, and the supporting member therefor, whereby the telescope can be caused to swing on a horizontal axis, and is also movable about a vertical axis; both of which movements can be effected in a very small degree, and the amount of which movements can be accurately determined.

The optical member or telescope in the present instrument comprises a tubular body 20 having a telescoping extension 21 that is shown as adjustable axially by means of a pinion 22 carried by the tube 20 and operated by a head 23, the pinion engaging the teeth of a rack 24 fast on the extensible tube 21. A casing 25 is secured to the lower end of the tube 20 and serves to support the optical elements for receiving the image through the tube or body 20, and project them into the eye-piece tube 26 that extends laterally from one side of the head 25 out of alinement of the tube 20, as best shown in Figs. 2, 6 and 16. The eye-piece member 26 is shown as provided with suitable lenses, as 27 and 28, and may be of any suitable construction. It is shown as having an extensible tube portion 29 telescoping in the body portion 26, for the purpose of obtaining the proper focus. The casing 25 is shown as provided with a Porro prism 30 suitably mounted in a frame 31, whereby one limb of the Porro prism is alined with the body-tube 20 of the telescope, to receive the image perpendicular to its hypotenuse face, and to deflect the image twice through ninety degrees, as indicated in the diagram of Fig. 16. When the image is received vertically on the Porro prism, it will be projected vertically into the eye-piece.

At the upper end of the telescope, the body 20 carries a suitable deflecting or reflecting member, in the present instance comprising a right-angle prism 32. This member is mounted in a suitable frame 33 having an aperture 34 at one side opposite the receiving face 36 of the prism. This aperture may be closed by a swinging door 35 when the instrument is not in use. The image received on the lateral face 36 of the prism 32 will be reflected by its hypotenuse face and bent ninety degrees, and projected axially through the body tube 20. The tube 20 is shown as provided with a lens 37 adjacent the emerging face of the prism 32. The image is thus received laterally relative to the tube 20, and projected through the tube onto the Porro prism 30, and therefrom is projected in another path in the opposite direction. The image is thereupon received by a suitable reflecting or deflecting member; and is shown as received upon a right angled prism 38, which member is also in alinement with the lenses of the eye-piece member 26. The image projected from the Porro prism is deflected by the right angle prism 38 into the eye-piece member and to be viewed by the operator. In the present instrument, the axis of the eye-piece lenses is parallel with the path of the image received by the first prism 32 at the upper end of the telescope. The usual form of cross-wires, or stadia wires may be mounted in the eye-piece tube 26 and supported by a frame 39 therein. By means of the combination of prisms and lenses shown, the image will be received erect, and with a maximum amount of definition.

The telescope member of the instrument is suitably supported for adjustment on a vertical axis, by means that can be properly leveled to insure the axis being a true vertical line. Such means comprehends mechanism for delicately adjusting the swing of the telescope to determine the azimuth or horizontal angle, and which angle will be accurately indicated. The telescope is further mounted on such support to swing on an axis perpendicular to the axis on which it sweeps the azimuth, whereby after this horizontal axis has been accurately located, the telescope may swing on such axis so that an image may be received on the prism 32 from an object situated above or below the horizontal level of the instrument. The telescope is mounted on the support so that the receiving or objective end of the body 20 is elevated some distance above the eye-piece member 26, as shown in Figs. 1 and 2. By this means the operator viewing the image through the eye-piece, can be shielded behind a wall, while the objective end of the telescope tube can project above the top of such wall and receive an image situated beyond the wall, that is intercepted thereby from the operator. By this means the operator cannot be sighted by an enemy situated beyond the wall, and therefore is in no danger of being picked off by a rifleman. One form of mechanism for permitting such operation and adjustment of the telescope is shown as comprising a head 40 to which are hinged suitable legs 41 that form a tripod. A ring 42 is internally threaded to engage a threaded flange 43 on the ring member 44, whereby the latter can be secured to the head, by a flange 45 on the ring 42 engaging the lower edge of the head plate 9. The ring 44 has a universally adjustable bearing connection with a sleeve member 98, by means of a curved bearing portion 46 on the sleeve engaging a similarly curved inner face of the ring member 44. By forcing the outer portions of the ring and sleeve member apart, the bearing members are forced together. Such movement is produced by a number of leveling screws, four screws 47, being shown that screw into the sleeve member 98, by their upper threaded portions. The lower ends of the screws press against the upper face of the ring member 44. By suitably operating these screws the sleeve member can be set at any desired angle within certain limits relative to the ring member 44. By this means the telescope member that is carried by the sleeve member 98 can be properly adjusted to cause the instrument to be absolutely level, which position is indicated by two spirit levels placed at right angles on the instrument below the telescope.

The telescope member is supported from a table member 50, by means of two uprights 51 and 52 thereon. The casing 25 of the telescope has trunnion extensions 53 and 54 that swing in bearing portions 55 and 56 at the top of the uprights 51 and 52. Two levels 57 and 58 are mounted on the table 50 and indicate when the table is properly leveled by the adjusted leveling screws 47. When the table is leveled, the axis of the trunnion support for the telescope is horizontal. The table 50 is supported from the sleeve member 98 to swing on an axis perpendicular to the table, and hence vertical when the table is level. In the present construction there is a double concentric movement on this vertical axis by means of an intermediate bearing member between the table and the sleeve member 98. This intermediate member carries an indicating scale, and by adjusting that member relative to the sleeve, the scale can be carried around with the telescope so that the telescope can be sighted on a certain object and the scale brought to the 0 position relative to an indicator on the table. Thereupon, the intermediate member may be locked relative to the supporting sleeve, and the table with the telescope swung around, which will cause the azimuth to be at once indicated on the adjusted scale. The table member 50 has secured thereto, a spindle 60, whose axis alines with the telescope tube 20 when in the vertical position. The spindle 60 rotates in a sleeve 61 secured to or integral with a disk 62; such disk is provided with a scale 63 on its upper face, that is visible through windows 64, and 65 in the table 50, as best shown in Fig. 12. The sleeve 61 that supports the spindle 60 is concentrically mounted for rotation in the bore of the sleeve 48 of the member 98. By these means the table and spindle, together with the bearing member 61 therefor can be rotated in the sleeve 48, or else the table and spindle 60 can be rotated in the sleeve 61.

The table 50 has an extension 66 (see Fig. 9) in which is pivoted a box 67 rotatably supporting a screw member 68. The threaded portion 69 of this screw engages the toothed periphery 70 of the disk 62, whereby rotation of the screw by its graduated head 71 will swing the table, and the telescope supported thereon. But when it is desired to swing the table more rapidly, the box 67 carrying the screw is swung on its pivot against the force of a retaining plate spring 72 by means of a crank pin 73 on a spindle 74, swinging in one end of the box, and operated by an arm 75. This movement of the screw out of engagement will permit free operation of the table, whereby it can be approximately adjusted, and then the screw returned into engagement and the table and telescope accurately positioned. This latter adjustment will permit the scale 63 to be brought approximately to any desired position relative to indicating marks, such as 76, or 77, on the table adjacent the windows therein; and thereupon the desired indication can be caused to register accurately with such mark, by the screw adjustment.

In Fig. 8 is shown means for swinging the indicating member 61, together with the table and parts carried thereon, by a very slow motion relative to the sleeve member 98. A clamping member 80 has a split ring portion 81 that encircles the socket 61 and is secured thereto, or released therefrom, by means of a rod 82 having its threaded end screwing into a socket 83 at the free end of the ring 81. The clamp member 80 has a depending lug 84 projecting between extensions 85 and 86 of the socket member 98. In a threaded aperture in the extension 85 operates a screw member 87 turned by a head 88. The lug 84 is pressed against the screw 87 by means of a plunger 89, that is forced against the opposite face of the lug by a spring 99; the spring and plunger operating in a bore of the tube carried by the extension 86. When the clamp is locked on the sleeve 61, it will carry the sleeve and telescope around with it. By adjusting the screw 88, the clamp and said parts will be swung in one direction or the other, whereby the telescope can be focused on an object, with the indicator member secured to the table in a registering position.

The mechanism for swinging the telescope on its trunnion support on the uprights is shown in Fig. 10. Adjacent the trunnion member 51 is secured a toothed sector 90 concentric with the axis of movement, which engages a screw rod 91 rotatable in a bearing box 92, that is pivotally secured on the inner side of the upright 51. The box is pressed upward to cause the screw to engage the sector, by a plate spring 93 fast on the table 50. The box can be swung downward to disengage the screw, whereupon the telescope can be swung freely through any desired angle. When it is desired to sight the telescope, it is placed approximately in focusing position, and then the screw 91 is operated by its head 94, that contains a scale registering with an indicating arm 95 carried by the box 92.

One method of using the instrument is as follows: The table 50 is moved relative to the indicator disk 62 carrying the scale, to bring the indicating point on the table to register with the 0 mark. This can be done very quickly upon releasing the screw 69 from the teeth of the disk by turning the arm 75. When such registration is approximately effected the screw 69 is returned to engagement, and then operated to cause accurate registering of the scale. The table and scale disk being now locked against relative movement, the clamp screw 82 is turned to loosen the clamp ring 81 permitting the table and the indicating disk 62 to be swung around. At the same time the telescope is swung on its horizontal axis for the proper altitude of the object in order to bring the latter into the line of sight. This can be done by operating the screw head 94, or by throwing the latter out of gear until the telescope is approximately sighted and then bring the screw into operation for more accurate adjustment. Upon the object being approximately sighted, the screw 82 is turned to tighten the clamp ring 81, thereby locking the clamp on the sleeve 61 of the indicating disk 62. The horizontal adjustment or angle is now more accurately obtained by turning the screw 87, that engages the lug 84 of the clamp, which is now rigidly connected with the sleeve 61. The screw if advanced will swing the indicator member with the table and telescope in one direction, or will permit the spring plunger to swing the said members in the opposite direction if retracted. By this means the telescope can be accurately sighted on the object, and at the same time, the 0 of the indication registers with the indicating mark. The next step is to swing the table and telescope around to sight another object; preferably an object in the rear, or in the opposite direction from that sighted; which object can be readily viewed by the gunner. To do this, the screw 69 is swung away from the teeth of the indicating disk by turning the arm 75 half a revolution, which will cause its crank pin 73 to hold the screw and disk out of engagement. This will leave the telescope table free to turn, and the telescope is now directed on the rear sight. When the latter is approximately located, the screw 69 is returned to engagement with the indicator disk, and is rotated to sight the object with necessary precision. Since the table and indicating scale were at the 0 position when sighted on the object, and since the indicator remains stationary while the table swings around with the telescope to sight the rear object, the angle through which the telescope moved, is the horizontal angle or conventional azimuth of the two objects from the plumb line or vertical axis of the instrument, and this azimuth or angular sweep is at once indicated on the scale. The inclination or declination of the object sighted is also indicated by means of the scale 96 carried by the segment member 90, which registers with an indicating arm 97 fast on the upright 51.

Having thus described my invention, I claim:

1. In an instrument of the class specified, the combination of a universally adjustable cone-shaped supporting member, a toothed disk having a cone-shaped sleeve supported by said member for rotation on a vertical axis, a table rotatable concentric with said disk and having a cone-shaped spindle in said sleeve, a screw supported for swinging movement relatively to the table and in mesh with the teeth of said disk whereby the disk is swung relatively to the table on the rotation of said screw and whereby the table may be rotated at considerable speed when the screw is thrown out of engagement with said teeth, an axially adjustable upright telescope supported for movement on a horizontal axis on the table and arranged to receive an image in an approximately horizontal path and deflect the image to project it in a substantially parallel path at a lower level and having at such lower level a transversely extending eye-piece, and adjusting means for accurately adjusting said upright telescope on its horizontal axis and organized to be thrown out of operation thereby to permit said telescope to be more rapidly swung on its horizontal axis.

2. In an instrument of the class specified, the combination of supporting means, a table carried thereby, an upright axially adjustable telescope carried by said table on a horizontal axis and arranged to receive an image in an approximately horizontal path and deflect the image to project it in a substantially parallel path at a lower level and having at such lower level an eye-piece, and means for accurately adjusting said telescope and organized to be thrown out of operation thereby to permit the upright telescope to be more speedily swung into position.

3. In an instrument of the class specified, the combination of a cone-shaped supporting member, a toothed disk having a cone-shaped sleeve supported by said member for rotation on a vertical axis, a clamp for engaging and disengaging the sleeve of said disk, a clamping screw carried by the clamp; means carried by the supporting member for adjusting the disk when the clamp is tightened thereon, a table rotatable concentric with said disk and having a cone-shaped spindle in the sleeve thereof, a screw supported by said table for swinging movement relatively to said disk and in mesh with the teeth of said disk, means for swinging said screw away from said disk, an upright telescope arranged to receive an image in an approximately horizontal path and deflect the image to project it in a substantially parallel path at a lower level and supported on a horizontal axis on said table, and means for accurately adjusting said telescope on its horizontal axis and supported for disengagement therewith, whereby the telescope may be rapidly swung into position, said telescope having an eye-piece at one side thereof at such lower level.

4. In a sighting instrument the combination of a telescope member arranged to receive an image in an approximately horizontal path and deflect the image to project it in a substantially parallel path at a lower level, a base member, a carrying member rotatable on the base member on a vertical axis, a table rotatable on the carrying member concentric therewith, a bearing member fast to the table and having a spindle rotatable therein and provided with a threaded portion, the carrying member having a disk provided with a toothed periphery engaging the threaded portion of said spindle whereby the carrying member is swung relative to the table by the rotation of the spindle, and uprights on the table, the telescope being supported on the uprights to swing on a horizontal axis.

5. In a sighting instrument the combination of a telescope member arranged to receive an image in an approximately horizontal path and deflect the image to project it in a substantially parallel path at a lower level, a base member, a carrying member rotatable on the base member on a vertical axis, a clamp arranged to engage and disengage the carrying member, an adjusting screw carried by the clamp, a lug carried by the base member engaged by said screw to relatively move the base member and carrying member when the clamp is secured to the carrying member, a table rotatable on the carrying member concentric therewith, a bearing member fast to the table and having a spindle rotatable therein and provided with a threaded portion, the carrying member having a disk provided with a toothed periphery engaging the threaded portion of said spindle whereby the carrying member is swung relative to the table by the rotation of the spindle, and uprights on the table, the telescope being supported on the uprights to swing on a horizontal axis.

6. In a sighting instrument the combination of a telescope member arranged to receive an image in an approximately horizontal path and deflect the image to project it in a substantial parallel path at a lower level, a base member, a leveling member having a universal adjustment on the base member, a carrying member rotatable on the leveling member on a vertical axis, a clamp arranged to engage and disengage the carrying member, an adjusting screw carried by the clamp, a lug carried by the base member engaged by said screw to relatively move the base member and carrying member when the clamp is secured to the carrying member, a table rotatable on the carrying member concentric therewith, a bearing member fast on the table having a spindle retatable therein and provided with a threaded portion, the carrying member having a disk provided with a toothed periphery engaging the threaded portion of said spindle whereby the carrying member is swung relative to the table by the rotation of the spindle, and uprights on the table, the telescope being supported on the uprights to swing on a horizontal axis.

7. In an instrument of the class specified, the combination of a universally adjustable supporting member, a rotatable disk supported thereby for rotation on a vertical axis, means for adjusting said disk with relation to its supporting member, a rotatable table supported by said disk for rotation on a vertical axis concentric with said disk, means for adjusting said table relatively to said disk and organized to be thrown out of operation to permit the adjustment of said table rapidly, a longitudinally adjustable upright telescope supported on said table on a horizontal axis and having at one side thereof an eye-piece and arranged to receive an image in an approximately horizontal path and deflect the image to project it in a substantially parallel path at a lower level and in line with said eye-piece, and means for accurately adjusting said telescope member on its horizontal axis and organized to be thrown out of operation to permit the more rapid adjustment of said telescope.

8. In an instrument of the class specified, the combination of an upright telescope arranged to receive an image in an approximately horizontal path and deflect the image to project it in a substantially parallel path at a lower level and made up of a plurality of axially adjustable sections, means comprising rack mechanism for adjusting one section relatively to the other, a transversely extending eye-piece adjacent to the lower end of said upright telescope, means for supporting said telescope for swinging movement on a horizontal axis, and means for accurately adjusting it on said axis and organized to be thrown out of operation thereby to permit said telescope to be more speedily swung into position, said supporting means comprising a universally adjustable cone-shaped member, a toothed disk having a cone-shaped sleeve supported by said member for movement on a vertical axis, means for adjusting said disk with relation to said supporting member, a rotary table having a cone-shaped spindle carried by said cone-shaped sleeve, and means for adjusting said table with relation to said disk and organized to be thrown out of engagement with said disk thereby to permit the table to be more speedily rotated.

AMBROSE SWASEY.

Witnesses:
F. H. RICE,
L. B. STAUFFER.